H. C. MICHEL.
COMBINED WEEDER AND CULTIVATOR.
APPLICATION FILED JULY 22, 1915.
1,175,003.
Patented Mar. 14, 1916.
3 SHEETS—SHEET 2.
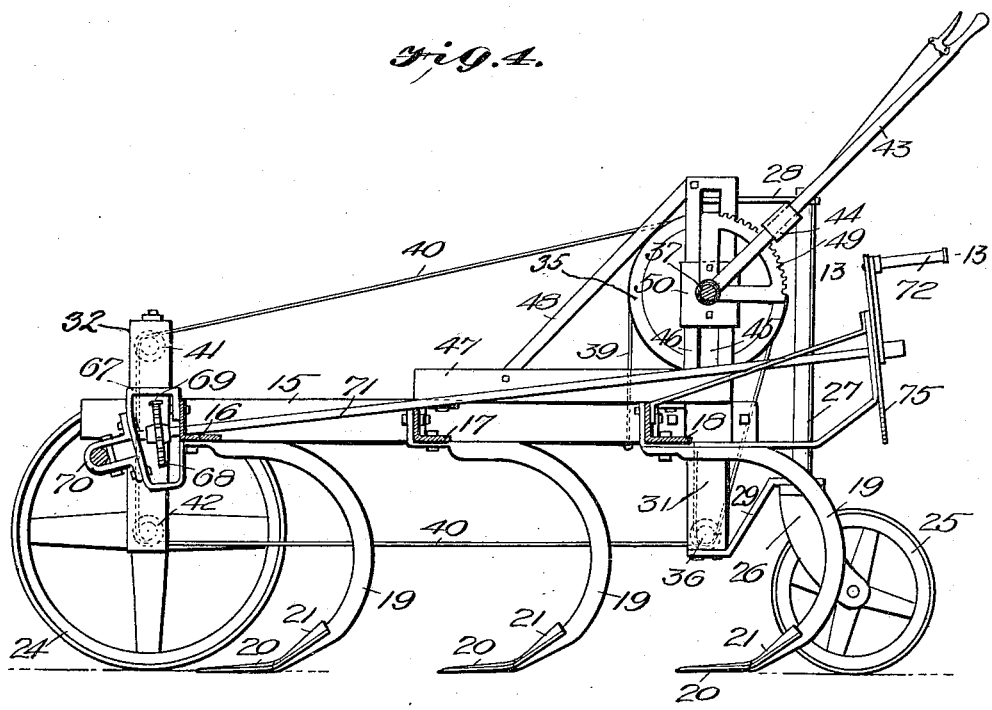
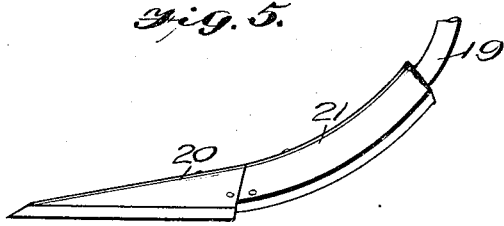
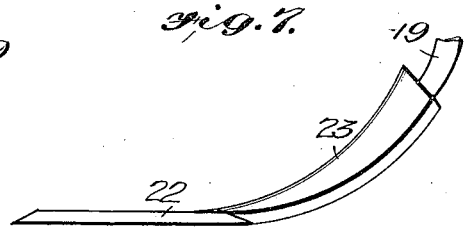
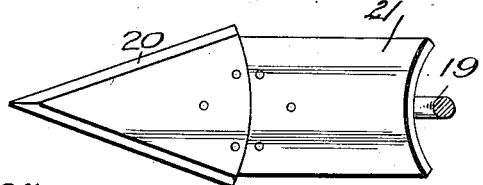
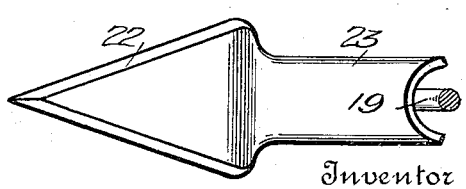
Witness
H. C. Barry
A. R. Walton
By
Inventor
Herman C. Michel
Max A. Schmidt
Attorney H. C. MICHEL.
COMBINED WEEDER AND CULTIVATOR.
APPLICATION FILED JULY 22, 1915.
1,175,003.
Patented Mar. 14, 1916.
3 SHEETS—SHEET 3.
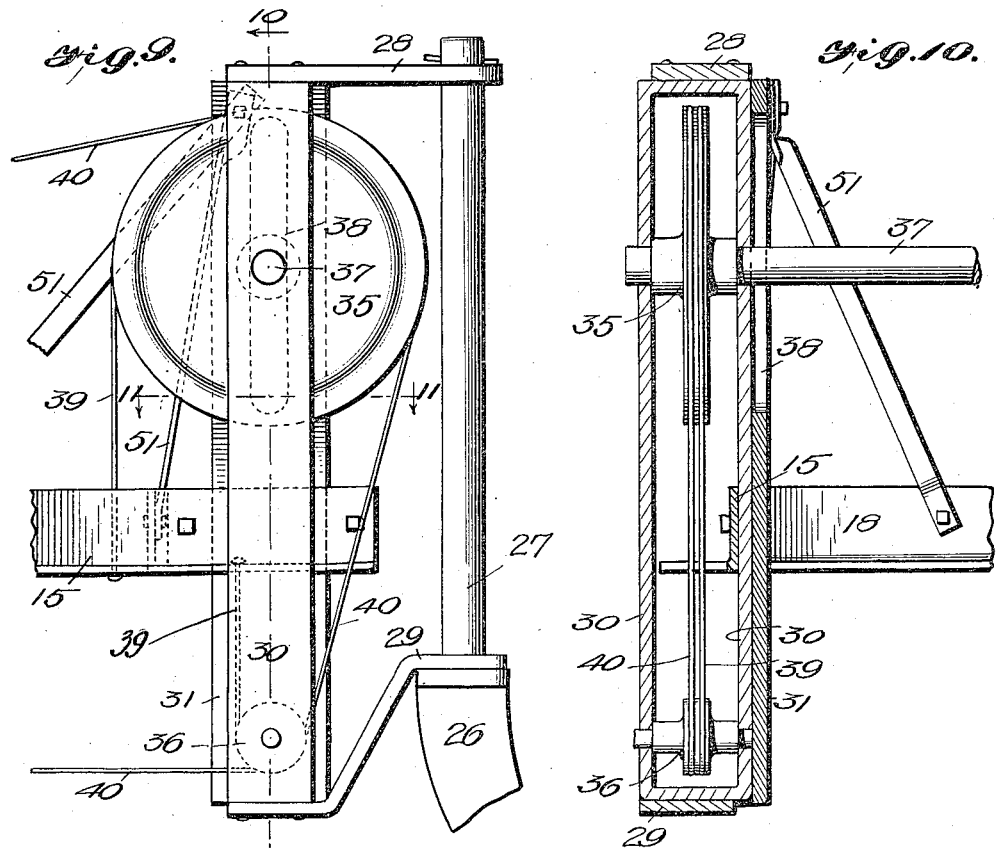
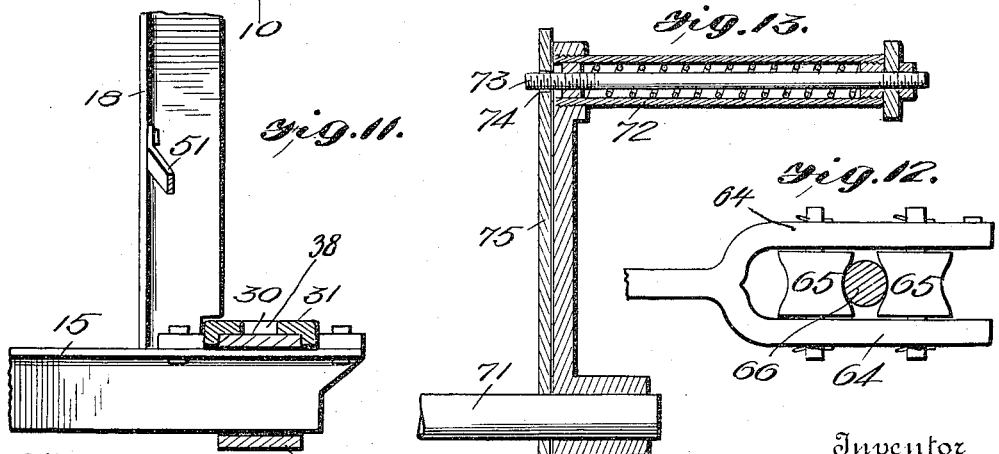

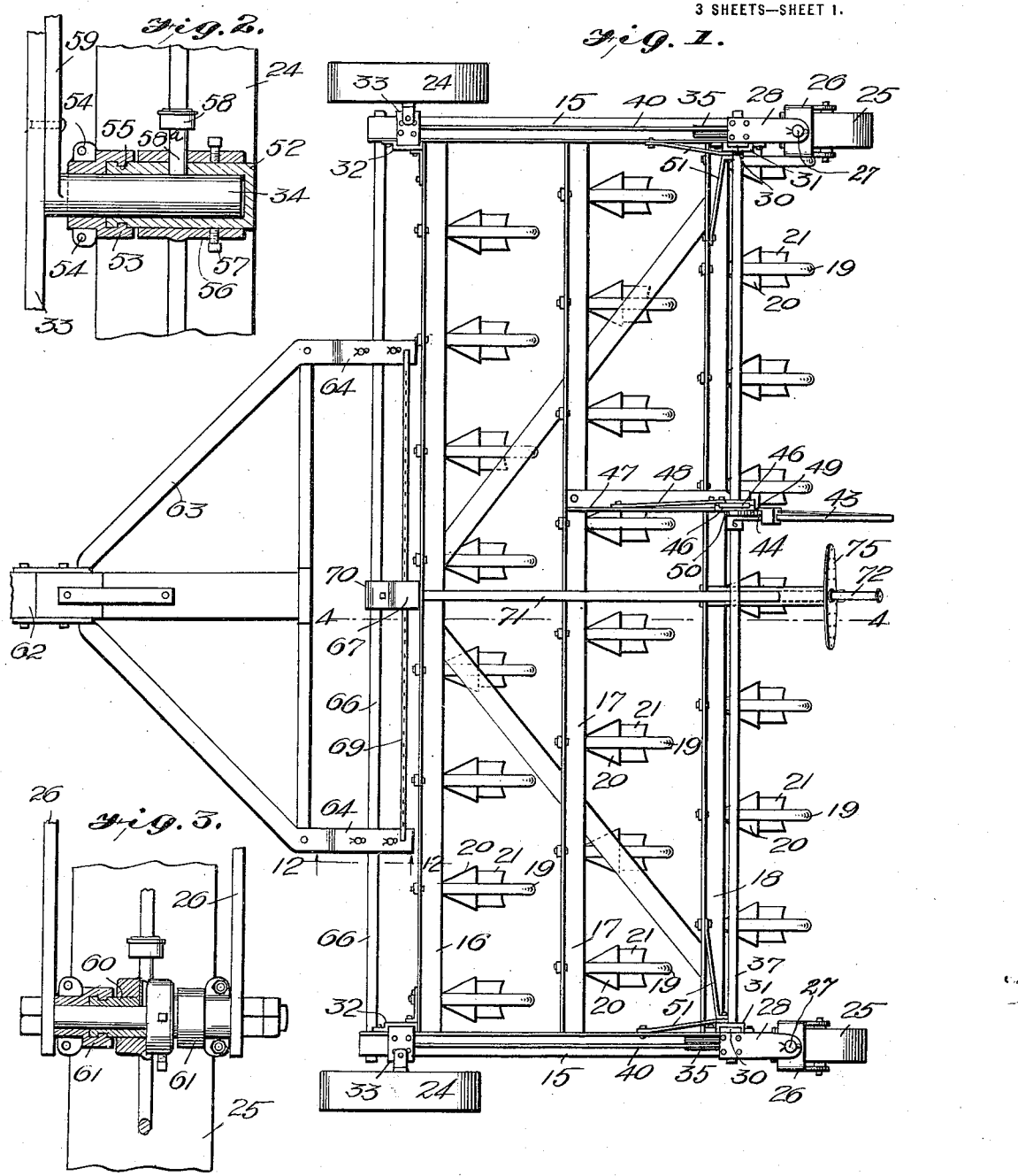

UNITED STATES PATENT OFFICE.

HERMAN C. MICHEL, OF DIXIE, WASHINGTON.

COMBINED WEEDER AND CULTIVATOR.

1,175,003.  Specification of Letters Patent.  Patented Mar. 14, 1916.

Application filed July 22, 1915. Serial No. 41,273.

*To all whom it may concern:*

Be it known that I, HERMAN C. MICHEL, a citizen of the United States, residing at Dixie, in the county of Walla Walla and State of Washington, have invented certain new and useful Improvements in Combined Weeders and Cultivators, of which the following is a specification.

This invention relates to improvements in combined weeding and cultivating machines, and its object is to provide a novel and improved machine of this kind which is easy to operate and efficient in doing the work for which it is designed.

The invention also has for its object to provide novel and improved means for raising and lowering the parts which carry the earth-working implements, and furthermore, to provide a means for shifting the draft tongue laterally so that the machine can be held on the side of a hill.

The objects stated are attained by means of a combination and arrangement of parts to be hereinafter described and claimed, reference being had to the accompanying drawings in which—

Figure 1 is a plan view of the machine; Fig. 2 is a sectional detail of the front wheel box; Fig. 3 is a sectional detail of the rear wheel box; Fig. 4 is a longitudinal section on the line 4—4 of Fig. 1; Fig. 5 is a side elevation of a weeding and cultivator shovel, and Fig. 6 is a plan view thereof; Fig. 7 is a side elevation of a slightly modified form of shovel, and Fig. 8 is a plan view thereof; Fig. 9 is an elevation of a raising and lowering mechanism; Fig. 10 is a vertical section on the line 10—10 of Fig. 9; Fig. 11 is a horizontal section on the line 11—11 of Fig. 10; Fig. 12 is an enlarged section on the line 12—12 of Fig. 1, and Fig. 13 is an enlarged section on the line 13—13 of Fig. 1.

Referring specifically to the drawings, the frame of the machine comprises laterally spaced, parallel side bars 15, connected by front, intermediate and rear cross bars 16, 17 and 18, respectively, supporting the earthworking members, the latter being shovels which are attached to curved shanks 19 bolted or otherwise made fast to the cross bars. The shovels are designed to cut weeds in the ground and to loosen the ground immediately after the cutting. As shown in Figs. 1, 2, 5 and 6, the shovels are in the form of flat blades 20 having sharpened side edges converging forward to a point. At the rear end of the blade is an upward continuation 21 thereof which is curved transversely and devoid of cutting edges, and serves to loosen up the ground after the weeds are cut by the blade 20. The blade 20 is slightly curved transversely. Figs. 7 and 8 show a blade 22 which is flat and has an integral upward extension 23 for the same purpose as the part 21.

The hereinbefore described frame which carries the shovels 20 or 22 is supported at the front on wheels 24, and at the rear on wheels 25, the latter being swiveled caster wheels. The wheels 25 are carried by forks 26 having upright stems 27 which are swivelingly supported by a bracket composed of top and bottom plates 28 and 29, respectively, and laterally spaced upright plates 30 connected at the top and bottom and rigidly secured to the plates 28 and 29. The shovel-carrying frame is suspended at its rear ends from the brackets so that it may be raised and lowered. The inner plates 30 form guides for slides 31 connected to the rear ends of the frame. These slides are upright plates which are channeled in cross-section, as shown in Fig. 11, and the inner plates 30 seat in the channels. The plates 31 are free to slide up and down on the plates 30, and as said plates 31 are fixed to the shovel-supporting frame, said frame may be raised or lowered. The front end of the shovel-supporting frame also carries slides 32 mounted in guides 33, to which latter are secured the axles 34 of the front wheels.

In order that the shovel-supporting frame may be uniformly elevated and lowered, and thus kept level, a raising and lowering means is provided, which comprises the following parts: Between the plates 30 are journaled top and bottom double-grooved pulleys 35 and 36, respectively. The top pulleys at the respective sides of the machine are connected by a transverse shaft 37, the slides 31 having vertical slots 38 through which the shaft passes and which permits the vertical travel of the slides. Over each top pulley 35 is trained a hoisting line 39 which is made fast at its ends to the side bar 15. One end of the line passes down directly to the side bar and is made fast thereto, and the other end passes down to and over the bottom pulley 36 and then passes upward and is made fast to the side bar. Over each top pulley is also trained a second hoisting line 40, one end of which extends forward to the front guide 33 and after passing down over a pulley 41 carried by said guide is made fast to the side bar 15. The other end of the line 40 passes down over the pulley 36 and is then carried forward and over a pulley 42 carried by the guide 33, and thence extends upward and is made fast to the side bar 15. Both sides of the machine are equipped with these hoisting means. The pulleys 35 and 36 are double grooved to hold the lines. The hoisting lines 39 and 40 are operated by rotating the pulleys 35, which is done by a hand lever 43 fast on the shaft 37 and provided with the customary latch 44. The hand lever is fastened to the shaft intermediate its ends, and said shaft here passes through a vertical slot 45 in an upright plate 46 carried by a longitudinal bar 47 mounted on the cross bars 17 and 18. A brace 48 connects the plate 46 and the bar 47. The plate 46 moves up and down with the shovel-supporting frame, hence the necessity for the slot 45. The toothed sector 49 for locking the lever is carried by a support 50 on which the plate 46 slides, the shaft 37 passing through said support and through the slot 45. When the hand lever 43 is swung down, the shovel-supporting frame is elevated, and when the hand lever is swung forward, said frame is lowered. The frame can therefore be easily lowered to bring the shovels to the required depth, or raised to take the shovels out of the ground when transporting the machine. Suitable braces 51 provide a rigid connection between the slides 31 and the shovel-supporting frame, and said slides are also bolted to the side bars 15.

Fig. 2 shows the box 52 of the front wheel 24. This box is made dust-tight by a two-part collar 53 clamped to the axle 34 by bolts passing through holes 54. The box has an annular groove at one end and over this end fits the collar, the latter having an internal annular rib 55 seating in the groove. The box runs loose on the axle and its connection with the collar 53, the latter being fast on the axle, prevents it from running off the axle. The hub 56 of the wheel is fastened to the box by set screws 57. A lubricant cup 58 is also provided from which a lubricant distributing pipe 58ᵃ runs through the box 52 to carry the lubricant to the axle 34. The axle 34 has a shank 59 which is fastened to the guide 33. The caster wheel 25 shown in Fig. 3 has a box 60 similar to the box 52, with the exception that each end has a dust excluding collar 61.

A means is also provided for holding the machine on a side hill, said means comprising the following parts: The draft tongue 62 of the machine is carried by a hound frame 63 having yokes 64 at its rear end, said yokes carrying rollers 65. Between these rollers and the yoke branches extends a shaft 66 carried by the front end of the shovel-supporting frame and extending transversely of said frame. The hound frame is thus slidably mounted on the shaft 66 so that it may be moved laterally from the center to put the draft on either side and thus hold the machine on a side hill.

The following means are provided for shifting the tongue 62: At the longitudinal center of the machine, the cross bar 16 carries a bracket 67 which supports a sprocket wheel 68. The yokes 64 are on opposite sides of the sprocket wheel and they are connected by a chain 69 trained over the sprocket wheel. It will therefore be seen that the hound frame 63 is shifted on the shaft, in either direction, when the sprocket wheel is turned. The bracket 67 carries a support 70 for the intermediate portion of the shaft. The sprocket wheel 68 is operated by a shaft 71 on which it is fast, said shaft extending to the rear end of the machine and being here equipped with an operating crank handle 72, carrying a spring latch 73 engageable with keeper apertures 74 in a plate 75 carried by the cross-bar 18. This plate also serves as a support for the rear end of the shaft 71, its front end being supported by the cross-bar 16.

I claim:

1. An agricultural machine comprising a supporting frame, earth-working elements carried by said frame, slides at the ends of the supporting frame, wheel-supported guides on which the slides are mounted for vertical movement, vertically spaced pulleys carried by the guides at one end of the supporting frame, hoisting lines passing over the pulleys, said lines having their ends connected to the supporting frame, one end extending downward from the top pulley and the other end upward from the bottom pulley, vertically spaced pulleys carried by the guides at the other end of the supporting frame, hoisting lines passing over the first-mentioned pulleys and extending therefrom to the second-mentioned end of the supporting frame, one end of the second-mentioned lines passing over the top ones of the second-mentioned pulleys and down to the supporting frame and made fast thereto, and the other end of the second-mentioned lines passing over the bottom ones of the second-mentioned pulleys and up to the supporting frame and made fast thereto, and means for turning one of the sets of pulleys to operate the lines.

2. An agricultural machine comprising a supporting frame, earth-working elements carried by said frame, slides at the ends of the supporting frame, wheel supported guides on which the slides are mounted for vertical movement, vertically spaced pulleys carried by the guides at one end of the supporting frame, hoisting lines passing over the pulleys, said lines having their ends connected to the supporting frame, one end extending downward from the top pulley and the other end upward from the bottom pulley, vertically spaced pulleys carried by the guides at the other end of the supporting frame, hoisting lines passing over the first-mentioned pulleys and extending therefrom to the second-mentioned end of the supporting frame, one end of the second-mentioned lines passing over the top ones of the second-mentioned pulleys and down to the supporting frame and made fast thereto, and the other end of the second-mentioned lines passing over the bottom ones of the second-mentioned pulleys and up to the supporting frame and made fast thereto, a shaft connecting the top pulleys at one end of the supporting frame, and means for turning the shaft.

3. An agricultural machine comprising a supporting frame, earth-working elements carried by said frame, slides at the ends of the supporting frame, wheel supported guides on which the slides are mounted for vertical movement, vertically spaced pulleys carried by the guides at one end of the supporting frame, hoisting lines passing over the pulleys, said lines having their ends connected to the supporting frame, one end extending downward from the top pulley and the other end upward from the bottom pulley, vertically spaced pulleys carried by the guides at the other end of the supporting frame, hoisting lines passing over the first-mentioned pulleys and extending therefrom to the second-mentioned end of the supporting frame, one end of the second-mentioned lines passing over the top ones of the second-mentioned pulleys and down to the supporting frame and made fast thereto, and the other end of the second-mentioned lines passing over the bottom ones of the second-mentioned pulleys and up to the supporting frame and made fast thereto, a shaft connecting the top pulleys at one end of the supporting frame, the slides at said end of the frame having vertical slots through which the shaft passes, and means for turning the shaft.

4. An agricultural machine comprising a supporting frame, earth-working elements carried by said frame, slides at the ends of the supporting frame, wheel-supported guides on which the slides are mounted for vertical movement, vertically spaced pulleys carried by the guides at one end of the supporting frame, hoisting lines passing over the pulleys, said lines having their ends connected to the supporting frame, one end extending downward from the top pulley and the other end upward from the bottom pulley, vertically spaced pulleys carried by the guides at the other end of the supporting frame, hoisting lines passing over the first-mentioned pulleys and extending therefrom to the second-mentioned end of the supporting frame, one end of the second-mentioned lines passing over the top ones of the second-mentioned pulleys and down to the supporting frame and made fast thereto, and the other end of the second-mentioned lines passing over the bottom ones of the second-mentioned pulleys and up to the supporting frame and made fast thereto, a shaft connecting the top pulleys at one end of the supporting frame, a slotted upright member carried by the supporting frame intermediate the sides thereof, through the slot of which member the shaft passes, a hand lever fast on the shaft, a locking sector for the hand lever, and a support for the sector through which the shaft passes, the aforesaid upright having a sliding connection with the support.

In testimony whereof I affix my signature in the presence of two witnesses.

HERMAN C. MICHEL.

Witnesses:
E. E. SANZE,
NELL M. ECKERSLEY.

Copies of this patent may be obtained for five cents each, by addressing the "Commissioner of Patents, Washington, D. C."